Sept. 18, 1951            E. W. HEROLD            2,568,394
HIGH-VOLTAGE DIRECT CURRENT POWER SUPPLY SYSTEMS
Original Filed June 3, 1947
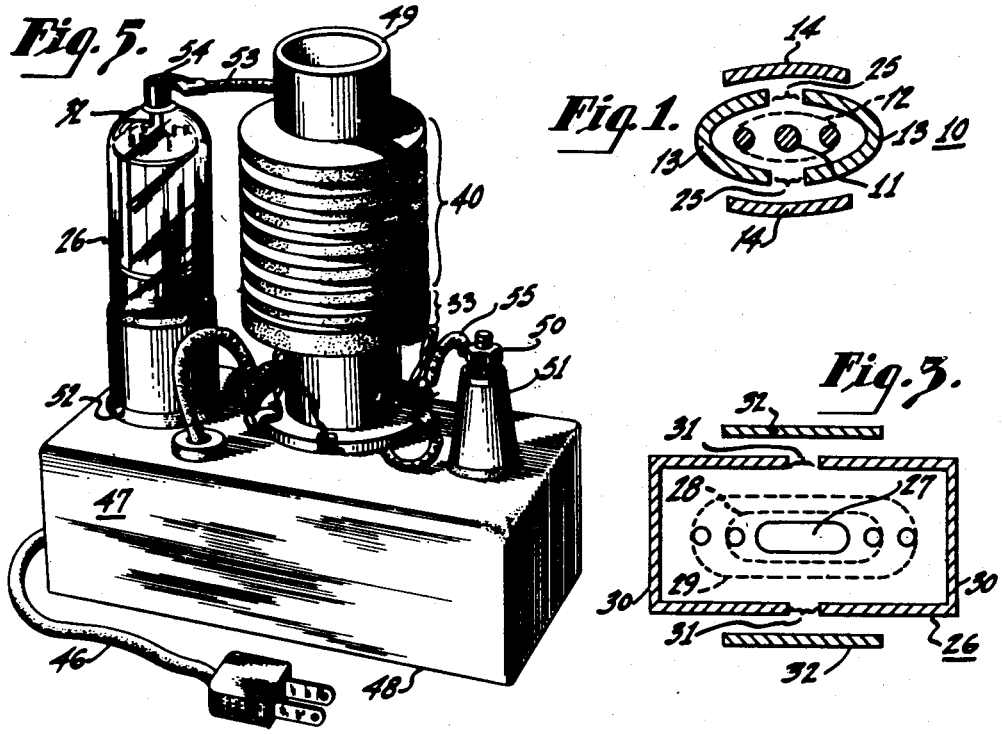
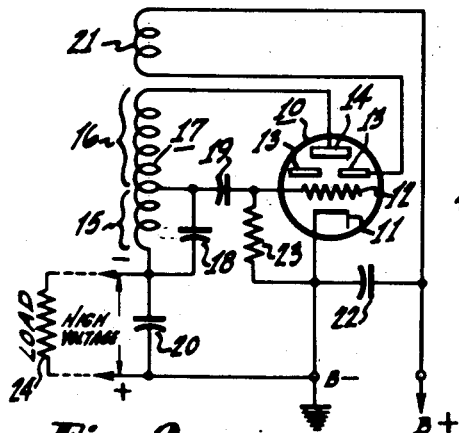
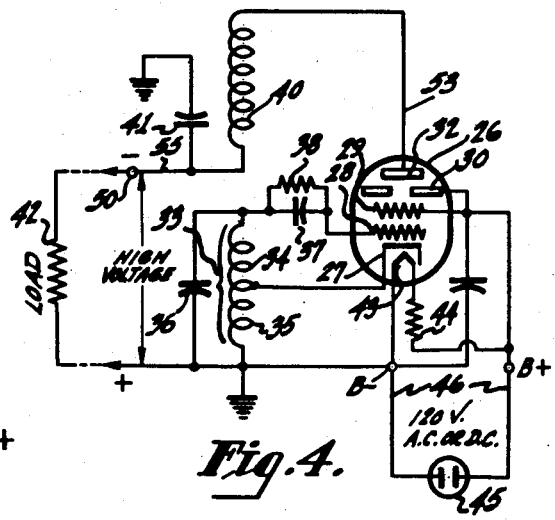
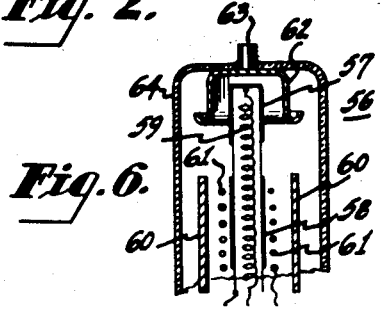
INVENTOR.
*Edward W. Herold*
BY *William A. Zalesski*
           ATTORNEY Patented Sept. 18, 1951

2,568,394

UNITED STATES PATENT OFFICE 2,568,394

HIGH-VOLTAGE DIRECT-CURRENT POWER SUPPLY SYSTEM

Edward W. Herold, Kingston, N. J., assignor to Radio Corporation of America, a corporation of Delaware Original application June 3, 1947, Serial No. 752,009. Divided and this application May 25, 1948, Serial No. 29,128

2 Claims. (Cl. 321—2)

This invention relates to power supply systems for producing high direct current voltages suitable for operation of cathode-ray tubes, electrostatic precipitators and the like.

This is a division of my co-pending application, Serial No. 752,009, filed June 3, 1947, now abandoned, and assigned to the same assignee as the present application.

In general, the object of the invention is to provide a small, light, inexpensive power supply unit directly energizable from a low-voltage power line and capable of delivering high, direct current voltage to loads having small current requirements.

In accordance with the invention, a single tube operable from a low-voltage source is used, with a radio-frequency transformer, both as an oscillator generating high-voltage, high-frequency current and as a rectifier for the high-voltage so generated.

More particularly, in one form of the invention, the tube may be a triode whose anode is divided, slotted, or otherwise constructed or disposed to provide one or more electron paths from the cathode of the tube to rectifier anode structure disposed beyond the triode anode; preferably, for enhanced power output the spacing between the anode and grid of the triode is small and the mesh of the grid is coarse.

In another form of the invention, the tube may be of the beam-power type with close spacing between the control grid and screen grid, and preferably with the corresponding elements of the two grids in alignment. The screen grid is connected to the anode so that the foregoing electrodes function as a triode having high transconductance. The anode is slotted, divided or otherwise apertured to provide one or more electron paths from the cathode to rectifier anode structure disposed beyond the triode anode.

The invention further resides in features of construction, combination and arrangement herein described and claimed.

For a more detailed understanding of the invention, reference is made to the accompanying drawings, in which:

Figure 1 is an enlarged plan view, in section, of the electrodes of an oscillator-rectifier tube;

Figure 2 schematically illustrates a power supply system using the tube of Fig. 1;

Figure 3 is an enlarged plan view, in section, of the electrodes of another form of oscillator-rectifier tube;

Figure 4 schematically illustrates a power supply system utilizing the tube of Fig. 3;

Figure 5, in perspective, shows a power supply unit incorporating the system of Fig. 4; and Figure 6 is a side elevational view, in section, of another form of oscillator-rectifier tube.

For the operation of cathode-ray oscillographs, electrostatic dust precipitators and the like, high direct-current voltages are required, although the current requirements of such devices are low. The usual power supplies comprising low-frequency step-up transformers, rectifiers and filter chokes for stepping up the alternating current voltage of a power line is expensive, bulky and heavy. Arrangements have been proposed for producing the high-voltage direct current by rectification of voltages developed by a radio-frequency oscillator, but in general they have been unduly expensive or unsatisfactory in operation. For example, one type required three tubes, a low-voltage rectifier, an oscillator, and a high-voltage rectifier whereas another form used an unorthodox tube using a plate-like grid remotely spaced from the cathode in avoidance of overheating of the grid or breakdown of the cathode, but in consequence had a mu of less than unity and a correspondingly low transconductance.

In contrast therewith and as will later appear, the inexpensive, small and light power supplies of this invention include only a single tube which serves both as an oscillator and as a high-voltage rectifier and can be operated directly either from an alternating current power line or from a direct current power line.

One suitable form of tube 10, shown in Fig. 1, comprises a cylindrical cathode 11 within which is disposed the usual heater (not shown). The cathode 11 is surrounded by a control grid 12 which, except in respects later mentioned, may be of normal construction; it may, for example, comprise a round or oval helix of fine wire with suitably spaced turns. The oscillator anode 13 which surrounds the grid and cathode may be of cylindrical or oval cross-section, generally in accordance with the usual anode construction, but is provided with two slots 25 which may extend partially or entirely along the length of the anode parallel to the cylindrical cathode 11. The electrodes thus far described form a triode having a mu substantially greater than unity. Beyond the openings or gaps between the two anode sections are disposed the electrodes 14 which comprises the split anode of the high-voltage rectifier section of tube 10.

In operation of the tube, the major part of the total cathode emission flows to the oscillator anode 13 and the minor part thereof flows through the gaps 25 of anode 13 to the rectifier anode 14. For enhanced cathode current and correspondingly increased output power at low oscillator anode voltage, the spacing between the anode 13 and grid 12 should be small, as of the order of ½ mm. to 1 mm. and the mesh of the grid should be similar to that used in power tubes. When it is not feasible further to reduce the spacing because of danger of shorting, greater output may be obtained by recourse to the tube constructions shown in Figs. 3 and 6 later described in detail.

A high-voltage power supply circuit using the tube 10 of Fig. 1 is shown in Fig. 2. The windings 15 and 16 form a radio-frequency step-up transformer 17, one terminal of whose secondary winding 16 is connected to the high-voltage rectifier anode 14 of tube 10. The primary winding 15 of the transformer is tuned by condenser 18 to the frequency at which the winding 16 is resonant by virtue of its distributed capacity and other stray capacities effectively in shunt thereto. The common terminal of the primary and secondary windings of transformer 17 is effectively connected to the grid 12 of tube 10, so far as radio-frequencies are concerned, by the blocking condenser 19. The other terminal of the primary winding is connected to the cathode 11 of the tube, so far as radio-frequencies are concerned, by the by-pass condenser 20. For operation of the triode section of tube 10 as an oscillator, the tickler coil or feedback winding 21 is inductively coupled to the transformer 17 and is connected to the oscillator anode 13 of the tube.

In the series-feed arrangement shown, the oscillator anode 13 is connected through the feedback coil 21 to the positive terminal B+ of a source of supply voltage whose negative terminal B— is connected to the cathode of the tube. However, this source of voltage may be a 110 volt power line, either alternating or direct; in the former case the oscillator triode section operates as a self-rectifying device.

The tuned primary circuit 15, 18, the feedback coil 21 and the triode section of tube 10 function as an oscillator, producing across the primary coil a radio-frequency voltage. By adjusting the condenser 18 so that the frequency of the oscillations generated approximately corresponds to the natural resonant frequency of the secondary winding of transformer 17, a very high radio-frequency voltage, of the order of at least several kilovolts, is produced across the terminals of the secondary winding 16. For each half cycle of the radio-frequency oscillations, the potential of grid 12 swings positive with respect to the cathode 11, and consequently electrons flow from the cathode to the oscillator anode 13 and also through the opening 25, to the high-voltage rectifier anode 14. For maximum output, the windings 15 and 16 are so poled that the high-frequency potential of the rectifier anode 14 is in phase with the high-frequency potential of the oscillator grid 12. The direct current passed by the rectifier anode 14 flows through the direct-current output circuit including the auto transformer 17 and the condenser 20 to charge the condenser to a direct-current voltage of magnitude closely corresponding with the stepped-up radio frequency voltage across the secondary winding 16. The high direct-current voltage available across the condenser 20 may be applied to a suitable high resistance load 24, such as the cathode to second anode circuit of a cathode-ray tube, the plates of a precipitator, or other low-current demand apparatus requiring high direct current voltage for its operation.

The direct-current difference of potential between the cathode of the tube and the common terminal of the primary and secondary windings of transformer 17 is far in excess of the grid biasing potential required for operation of the oscillator section of the tube; the blocking condenser 19, however, prevents application of this potential to the grid 12 and the proper operating potential of the grid is provided by the grid leak 23 connected between the cathode 11 and grid 12. Condenser 19 must be a high-voltage condenser capable of withstanding several kilovolts. The cathode heater, if of the 110-volt type, may be directly connected to the terminals B—, B+ of a power line; if of lower voltage type, for example of the 58-volt type, a suitable series resistor is employed. The condenser 22 connected across the terminals B+, B— serves as a by-pass condenser to prevent the radio-frequency currents of anode 13 from getting into the power line and to reduce the radio-frequency impedance thereof. All of the components of Fig. 2 may be packaged as a compact unit similar to that shown in Fig. 5.

In another form of oscillator-rectifier tube 26 affording greater output, the cathode 27, Fig. 3, is of oval or generally similar cross-section to provide a large electron-emitting area close to the inner or control grid 28. A second or outer grid 29, whose turns are preferably in alignment with those of grid 28 to reduce the dissipation by grid 29, is spaced very closely from grid 28 to draw relatively high current from the cathode 27 when the grid 29 is positive with respect thereto. The oscillator anode 30 of tube 26, like that of tube 10 (Fig. 1), is divided or slotted, as at 31, to provide an electron path from the cathode 27 to a split high-voltage rectifier anode 32 disposed outside or beyond the anode 30 in alignment with the cathode and the gaps 31. Heat-dissipating fins may also be used on anode 30, if required to allow higher power dissipation. The inner section of the tube is similar to a beam power tetrode, but can be used as a triode as shown in Fig. 4 where the outer grid 29 is connected to the anode 30. The high-voltage rectifier anode 32 is supported at the top of the tube, Fig. 5, and there connected to an external cap or terminal. The heater, now shown, is disposed within the cathode 27 and is preferably designed to operate directly from the power line voltage, for example, 110 volts, though a lower voltage heater may be used with a suitable series resistance.

The tube 26 may be used in the circuit shown in Fig. 2, but is preferably used in the circuit of Fig. 4. In fact, either tube 10 or 26 may be used in either of the circuits of Fig. 2 or Fig. 4, the latter having advantages which will appear in subsequent discussion thereof.

In Fig. 4, the oscillator portion of the power supply comprises the winding 33 tuned by condenser 36 to the operating frequency, and the electrodes 27, 28, 29 and 30 of tube 26. The grid section 34 of winding 33 is connected between the cathode 27 and grid 28 of tube 26. One terminal of the anode section 35 of the winding 33 is connected to the cathode 27 and the other terminal of the winding 35 is connected through the radio-frequency by-pass condenser 39 to the oscillator anode 30 and outer grid 29 of tube 26. The inner section of tube 26 and the windings 34, 35 thus form an oscillator circuit producing a high-frequency voltage across the winding 33. The winding 33 serves as the primary of a radio-frequency step-up transformer whose secondary 40 is connected to the high-voltage rectifier anode 32 of tube 26. The windings 33 and 40 are preferably so poled that the radio-frequency potentials of the rectifier anode 32 and the control grid 28 of the oscillator section of the tube are in phase, thus to insure that maximum current is available to the rectifier anode 32 at the time of each cycle when rectification occurs.

As the windings 33 and 40, unlike the windings 15 and 16 of Fig. 2, of the radio-frequency step-up transformer are now separate, the blocking condenser 37 is not subjected to the high direct current voltage produced by rectification of the output of coil 40 and the grid leak resistor 38 may be connected across the blocking condenser to minimize absorption of power from the oscillator circuit.

The condenser 36 is adjusted so that the frequency of the generated oscillations approximately coincides with the natural resonant frequency of the transformer secondary 40, thus to produce across the secondary winding a very high radio-frequency difference of potential. The direct current resulting from application of this radio-frequency voltage to the anode 32 of tube 26 charges the high-voltage condenser 41 to a direct current voltage approximately corresponding with the radio-frequency voltage across the secondary winding 40. This high voltage may be applied to a cathode-ray oscilloscope, dust precipitator or other high impedance device generically represented by the load resistor 42.

The high-voltage condenser 41 need be only large enough effectively to bypass the radio-frequency, usually several hundreds of kilocycles, but if the oscillator is operated from a 60-cycle line, there will be a decided 60-cycle ripple component in the D. C. output voltage appearing between the terminal 55 and ground unless the time constant of condenser 41 and the effective load resistance is large enough to afford satisfactory filtering at 60 cycles. If ripple-free high-voltage is required, conventional inexpensive resistance-capacity filters may be interposed between the load and the output terminals in the power supply system.

By way of example, a power supply system of the type shown in Fig. 4 and having the constants given below delivered 6,000 volts to a 50 megohm load and 4,000 volts to a 15 megohm load when a 120 volt 60-cycle source was connected to the cathode and anode terminals of the oscillator section of tube 26. The anode current of the high-voltage rectifier section is small, of the order of several hundred microamperes, whereas the anode current of the low-voltage oscillator section is relatively high, for example, of the order of 20 to 50 or more milliamperes. The heater 43 of the tube, if of the 110-volt type, may also be directly operated from the same source, although in a particular example given below the tube had a 58-volt heater in series with a resistor 44.

Coil 33.—50 turns; 60/38 Litzendraht wire, tapped at 30 turns, wound in quarter-inch pi, 3 turns per layer.

Coil 40.—2100 turns; 3/41 Litzendraht wire, wound in 7 pis. Each pi is 1/16 inch thick and has 300 turns. Spacing between windings 40 and 33 is 1/4 inch, between pis, spacing is 1/16 inch.

Condenser 37.—0.001 microfarad.
Condenser 41.—0.002 microfarad.
Condenser 39.—0.1 microfarad.
Condenser 36.—0.004 microforad (approximate value, should be adjusted for resonance).
Resistor 38.—1000 ohms.

The overall dimensions of the power supply unit 47 incorporating these components of the system of Fig. 4 are only approximately five inches x two inches x six inches, and the unit weighs very little. As shown in Fig. 5, the unit 47 may be provided with input leads or cord 46 provided with a plug for convenient connection to a power outlet 45, Fig. 4, for energization of the heater and for application of the operating voltage of the oscillator anode. All of the components may be mounted upon or within a small metal chassis 48. On the upper side of the chassis 48 is mounted the core or coil-form 49 of suitable insulating material, such as bakelite or fibre, upon which are disposed the pi-sections forming the windings of the oscillator and high-voltage transformer. The lead 55 from the high-voltage secondary 40 extends to the output terminal 50 suitably isolated from the chassis by the standoff insulator 51. The high-voltage capacitor 41 is of the ceramic dielectric type and is underneath the chassis, connected to terminal 50. The tube 26, or equivalent, is mounted in a conventional tube socket 52 disposed in the upper face of the chassis. The external terminal of the high-voltage rectifier anode 32 receives the clip 54 of the lead 53 extending from the other end of the high-voltage secondary winding 40. In avoidance of voltage breakdown, the high-voltage rectifier anode 32 is supported within the tube 26 only from the top mica element, and large slots are cut in this mica, between the rectifier anode and the electrodes forming the oscillator section of the tube to reduce leakage.

A still further form of tube suitable for use in this unit, or in either of the systems of Figs. 2 and 4, is shown in Fig. 6. In tube 56, the cathode is an elongated cylinder having an upper section 57 and a lower section 58, both heated from a common heater element 59 disposed within the tubular cathode. The lower section of the cathode, the anode 60 and the grid 61, are comprised in the oscillator section of the tube. The upper section 57 of the cathode and the auxiliary anode 62 form the high-voltage rectifier section of the tube. The rectifier anode 62 may be substantially spaced from the triode section and its edges rolled or curved to minimize sparkover. As in tubes 10 and 26 connections from the low-voltage oscillator section of the tube extend through the base, whereas the external connection 63 for the high-voltage rectifier section extends through the top of the tube envelope 64. All of the tubes 10, 26 and 56, notwithstanding the high voltages involved, are small, and, as evident from Fig. 5, approximately the same size as receiving tubes.

It shall be understood the invention is not limited to the particular circuits and tubes illustrated, but that changes and modifications may be made within the scope of the appended claims.

I claim as my invention:

1. A high voltage direct current power supply comprising a discharge tube having at least a first anode and cathode with a control electrode intermediate between said first anode and cathode, said first anode having an aperture in the structure thereof, and a second anode outside said first anode and positioned to receive electron flow through said first anode aperture, a first and second lower impedance windings and a third higher impedance winding electromagnetically coupled with one another, connections placing said first winding in series with a circuit between said first anode and said cathode, connections applying voltage induced in said second winding to the control electrode cathode circuit of said discharge tube, the polarity of the winding adjusted to sustain oscillation in said discharge tube, a high voltage output terminal, connections placing said third winding between said output terminal and said discharge tube second anode.

2. A high voltage direct current power supply comprising a discharge tube having at least a first anode and cathode with a control electrode intermediate between said first anode and cathode, said first anode having an aperture in the structure thereof, and a second anode outside said first anode and positioned to receive electron flow through said first anode aperture, a transformer having a first and second low impedance winding section taps and a high impedance winding, connections placing said first low impedance winding taps in shunt with said control electrode and cathode, connections placing said second low impedance winding taps in shunt with said control electrode and first anode, the poling of said second winding section relative to said first winding section being such to produce oscillations in said discharge tube, a high voltage output terminal, and connections placing said high impedance winding between said high voltage output terminal and said discharge tube second anode.

EDWARD W. HEROLD.

REFERENCES CITED

The following references are of record in the file of this patent:

UNITED STATES PATENTS

| Number | Name | Date |
| --- | --- | --- |
| 1,823,837 | Miessner | Sept. 15, 1931 |
| 2,059,683 | Farnsworth | Nov. 3, 1936 |
| 2,104,463 | Johnson et al. | Jan. 4, 1938 |
| 2,137,356 | Schlesinger | Nov. 22, 1938 |
| 2,306,888 | Knick | Dec. 29, 1942 |
| 2,373,165 | Cawein | Apr. 10, 1945 |

FOREIGN PATENTS

| Number | Country | Date |
| --- | --- | --- |
| 528,228 | Great Britain | Oct. 24, 1940 |